(12) United States Patent
Garrett et al.

(10) Patent No.: US 6,877,033 B1
(45) Date of Patent: *Apr. 5, 2005

(54) NETWORK-BASED INTEGRATED DEVICE IDENTIFICATION AND ORDERING SYSTEM

(75) Inventors: Wanda Carol Garrett, Morgan Hill, CA (US); Martin Garrison, San Jose, CA (US); Jeffrey Robert Perry, Cupertino, CA (US); Rex Liebert Allison, III, Santa Clara, CA (US); Richard Joel Levin, Sunnyvale, CA (US); Vandana Sojorani, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 764 days.

This patent is subject to a terminal disclaimer.

(21) Appl. No.: 09/707,325

(22) Filed: Nov. 6, 2000

(51) Int. Cl.$^7$ ............................................. G06F 15/16
(52) U.S. Cl. ......................... 709/218; 709/223; 716/15
(58) Field of Search ................................ 709/218, 231, 709/232, 203, 217, 223; 706/50; 716/15, 18; 702/65; 345/765, 735; 327/277; 361/683; 324/754; 385/135; 707/10, 100; 700/97; 703/13

(56) References Cited

U.S. PATENT DOCUMENTS

| | | | | |
|---|---|---|---|---|
| 5,032,789 A | * | 7/1991 | Firooz et al. ................ 324/754 |
| 5,335,323 A | * | 8/1994 | Kolnick ....................... 345/765 |
| 5,581,781 A | * | 12/1996 | Gregory et al. .............. 716/18 |
| 5,778,132 A | * | 7/1998 | Csipkes et al. ............. 385/135 |
| 5,831,610 A | * | 11/1998 | Tonelli et al. .............. 345/735 |
| 5,903,886 A | * | 5/1999 | Heimlich et al. ............ 706/50 |
| 6,041,349 A | * | 3/2000 | Sugauchi et al. ........... 709/223 |
| 6,058,262 A | * | 5/2000 | Kawas et al. ................ 703/13 |
| 6,195,613 B1 | * | 2/2001 | Roy et al. .................... 702/65 |
| 6,334,131 B2 | * | 12/2001 | Chakrabarti et al. ......... 707/10 |

(Continued)

OTHER PUBLICATIONS

Effective Search Strategies for Application–Independent..— Joseph Dixon And (1997); ftp.cc.gatech.edu/pub/coc/tech_reports/1997/GIT–CC–97–02.iccn97.ps.Z.*

(Continued)

*Primary Examiner*—Jack B. Harvey
*Assistant Examiner*—Thong Vu
(74) *Attorney, Agent, or Firm*—Christian A. Nicholes; Hickman Palermo Truong & Becker LLP

(57) ABSTRACT

Techniques are provided for designing a circuit that satisfies user-specified functional requirements without the user having to obtain additional education or possess specialized software. According to one embodiment, user-specified functional requirements are received over a network from a client executing a browser. The network may be, for example, the Internet. Based on the user-specified requirements, components and a topology for constructing the circuit are automatically determined. The components determined during this operation have operational values such that, when the components are arranged according to the topology to form the circuit, the circuit satisfies the user-specified functional requirements. One or more web pages that identify the components are then delivered to the browser over the network. According to one aspect of the invention, the component and topology information is used to generate a schematic diagram that is delivered in a web page to the user over the network. According to another aspect of the invention, the user is provided with a web page that has a control which, when selected, initiates an operation for placing an order over said network for one of the components, a kit of all of the components, a custom made circuit made from the components, and/or a prefabricated circuit that is functionally similar to the one that was designed.

36 Claims, 19 Drawing Sheets

U.S. PATENT DOCUMENTS

| | | | | |
|---|---|---|---|---|
| 6,397,117 B1 | * | 5/2002 | Burrows et al. | 700/97 |
| 6,477,694 B1 | * | 11/2002 | Irino et al. | 716/15 |
| 6,545,862 B1 | * | 4/2003 | Gettemy et al. | 361/683 |
| 6,567,812 B1 | * | 5/2003 | Garrecht et al. | 707/100 |
| 6,662,221 B1 | * | 12/2003 | Gonda et al. | 709/223 |
| 6,678,877 B1 | * | 1/2004 | Perry et al. | 716/15 |
| 6,696,875 B1 | * | 2/2004 | Arkas et al. | 327/277 |

OTHER PUBLICATIONS

Optimizing Printed Circuit Board Assembly During The Design..—Giachetti ; www.faim2000.isr.umd.edu/faim/export/Ta2_0006.pdf.*

PROPOSED Projects for May 1999; seniord.ee.iastate.edu/root_backup/proposed_may99%20projects.htm.*

ECE News ; www.eece.maine.edu/ecenews/october00.html.*

Performance benchmarking of signaling in ATM networks Niehaus, D et al IEEE , vol.: 35, Issue: 8 , Aug. 1997.*

Web–Based Configuration Of Virtual Private Networks..— Felfernig Friedrich.. www.ifi.uni–klu.ac.at/IWAS/GF/Staff/Alexander.Felfernig/Publica.*

* cited by examiner

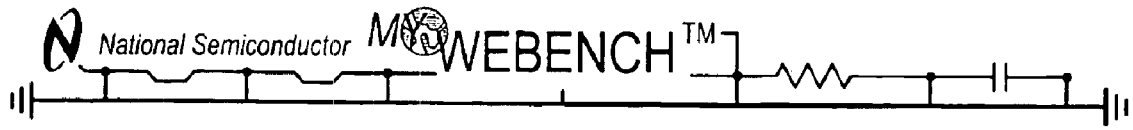

My Webench

My Webench organizes your designs with secure password protected storage. Design details include your specifications, bill of material, schematic, simulations and on line ordering of parts and demo boards.

You currently have no stored designs.

Select one of the Design Assistants to start a New Design.

Webench Tools

Assistants Save Your Time!

Let our Design Assistants guide you through each step. You can choose from either the

- Power Supply Design Assistant

204 or

- Wireless EasyPLL Design Assistant.

206

The assistant will walk you through each of the steps. You can choose when to stop as you can always return later to finish another step.

Visit these portals having Webench tools;

- POWER.NATIONAL.COM
  featuring WebSIM™

- WIRELESS.NATIONAL.COM
  featuring EasyPLL

Using Webench Tools

Four Easy Steps and You're Done!

> 1 Choose a Part >

Input your system specifications and you will find those devices that fit.

> 2 Create a Design >

A design will be created for you including any necessary passive components and important calculated operating values.

> 3 Analyze a Design >

Use a variety of simulation tests to validate your design.

> 4 Build It! >

Buy a part, kit of parts, evaluation board.

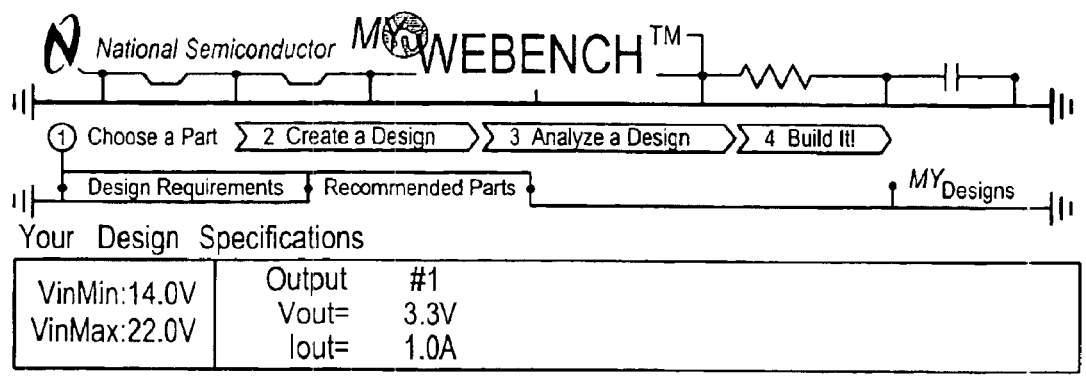

Your Design Specifications

| VinMin:14.0V VinMax:22.0V | Output #1 Vout= 3.3V Iout= 1.0A |
|---|---|

Suggested Switching Regulators - Buck Topology

| Product Folder (402) | Webench Tools (404) | Max Curr. | Typ. Eff. | On/Off | Err. Pin | Other Features | Freq. kHz | Est. Price |
|---|---|---|---|---|---|---|---|---|
| LM2575-3.3 | Create Design / See CC Note below | 1.0A | 75% | Y | N |  | 52 | $1.72 |
| LM2575-ADJ | Create Design / See CC Note below | 1.0A | 75% | Y | N | Adj. Vout | 52 | $2.15 |
| LM2575HV-3.3 | Create Design / See CC Note below | 1.0A | 75% | Y | N |  | 52 | $2.15 |
| LM2575HV-ADJ | Create Design / See CC Note below | 1.0A | 75% | Y | N | Adj. Vout | 52 | $2.15 |
| LM2576-3.3 | Create Design / See CC Note below | 3.0A | 75% | Y | N |  | 52 | $2.40 |
| LM2576-ADJ | Create Design / See CC Note below | 3.0A | 75% | Y | N | Adj. Vout | 52 | $2.40 |
| LM2576HV-3.3 | Create Design / See CC Note below | 3.0A | 75% | Y | N |  | 52 | $2.98 |
| LM2576HV-ADJ | Create Design / See CC Note below | 3.0A | 75% | Y | N | Adj. Vout | 52 | $2.98 |
| LM2595-3.3 | Create Design | 1.0A | 78% | Y | N |  | 150 | $1.86 |
| LM2595-ADJ | Create Design | 1.0A | 78% | Y | N | Adj. Vout | 150 | $1.86 |
| LM2596-3.3 | Create Design | 3.0A | 73% | Y | N |  | 150 | $2.61 |
| LM2596-ADJ | Create Design | 3.0A | 73% | Y | N | Adj. Vout | 150 | $2.61 |
| LM2598-3.3 | Create Design | 1.0A | 78% | Y | Y | SoftStart | 150 | $2.18 |
| LM2598-ADJ | Create Design | 1.0A | 78% | Y | Y | SoftStart, Adj. Vout | 150 | $2.18 |
| LM2599-3.3 | Create Design | 3.0A | 73% | Y | Y | SoftStart | 150 | $2.91 |
| LM2599-ADJ | Create Design | 3.0A | 73% | Y | Y | SoftStart, Adj. Vout | 150 | $2.91 |
| LM2630 | Create Design / SeeCC Note below | 8.0A | 94% | Y | Y | Sync, SoftStart, Adj. Peak Current Limit | 200 | $2.75 |
| LM2631 | Create Design / SeeCC Note below | 8.0A | 94% | Y | Y | Sync, SoftStart, Adj. Peak Current Limit | 200 | $2.75 |
| LM2670-3.3 | Create Design / See CC Note below | 3.0A | 86% | Y | N | Sync, SoftStart | 260 | $2.63 |

Fig. 4

   *National*   Design  Purchasing  Quality  Company  Jobs
             *Semiconductor*

Products > Analog - Regulators > Simple Switchers > LM2575

Product Folder

LM 2575   SIMPLE   SWITCHER   1A Step-Down Voltage Regulator

See Also:  LM2595  -  low cost & more efficient
           LM2598  -  upgrade
      502  LM2672  -  upgrade
           LM2675  -  upgrade Generic P/N 2575

Contents

- General Description
- Features
- Applications
- Datasheet
- Package Availability, Models, Samples & Pricing
- Design Tools
- Application Notes

504

| Parametric Table | |
|---|---|
| Multiple Output Capability | No |
| On/Off Pin | Yes |
| Error Flag | No |
| Input Voltage, min (Volt) | 4 |
| Input Voltage, max (Volt) | 40 |
| Output Current, max | 1 Amp |
| Output Voltage (Volt) | 12,15,3.30,5,1.20 |
| Adjustable Output Voltage | No,Yes |
| Switching Frequency (Hz) | 52000 |
| Adjustable Switching Frequency | No |
| Sync Pin | No |
| Efficiency (%) | 88,75,77 |
| Inverting | Yes |
| Step-down | Yes |

*Fig. 5A*

General Description

The LM2575 series of regulators are monolithic integrated circuits that provide all the active functions for a step-down (buck) switching regulator, capable of driving a 1A load with excellent line and load regulation. These devices are available in fixed output voltages of 3.3V, 5V, 12V, 15V, and an adjustable output version.

Requiring a minimum number of external components, these regulators are simple to use and include internal frequency compensation and a fixed-frequency oscillator.

The LM2575 series offers a high-efficiency replacement for popular three-terminal linear regulators. It substantially reduces the size of the heat sink, and in many cases no heat sink is required.

A standard series of inductors optimized for use with the LM2575 are available from several different manufacturers. This feature greatly simplifies the design of switch-mode power supplies.

Other features include a guaranteed ±4% tolerance on output voltage within specified input voltages and output load conditions, and ±10% on the oscillator frequency. External shutdown is included, featuring 50μA (typical) standby current. The output switch includes cycle-by-cycle current limiting, as well as thermal shutdown for full protection under fault conditions.

*Fig. 5B*

Features

- 3.3V, 5V, 12V, 15V, and adjustable output versions
- Adjustable version output voltage range, 1.23V to 37V (57V for HV version) ±4% max over line and load conditions
- Guaranteed 1A output current
- Wide input voltage range, 40V up to 60V for HV version
- Requires only 4 external components
- 52 kHz fixed frequency internal oscillator
- TTL shutdown capability, low power standby mode
- High efficiency
- Uses readily available standard inductors
- Thermal shutdown and current limit protection
- P+ Product Enhancement tested

Applications

- Simple high-efficiency step-down (buck) regulator
- Efficient pre-regualtor for linear regulators
- On-card switching regulators
- Positive to negative converter (Buck-Boost)

Datasheet

| Title | Size (in Kbytes) | Date | View Online | Download | Receive via Email |
|---|---|---|---|---|---|
| LM1575/LM2575/LM2575HV Series SIMPLE SWITCHER 1A Step-Down Voltage Regulator | 609 Kbytes | 1-Jun-99 | View Online | Download | Receive via Email |
| LM1575/LM2575/LM2575HV Series SIMPLE SWITCHER 1A Step-Down Voltage Regulator (JAPANESE) | 894 Kbytes | | | | |

*Fig. 5C*

Package Availability, Models, Samples & Pricing

| Part Number | Package Type | # pins | Status | Models SPICE | Models IBIS | Samples & Electronic Orders | Budgetary Pricing Quantity | Budgetary Pricing $US each | Std Pack Size | Package Marking |
|---|---|---|---|---|---|---|---|---|---|---|
| LM2575M-12 | SOIC WIDE | 24 | Full production | N/A | N/A | Samples | 1K+ | $1.7200 | tube of 30 | [logo]¢U¢Z¢2¢T LM2575M -12 P+ |
| LM2575M-15 | SOIC WIDE | 24 | Full production | N/A | N/A | Samples | 1K+ | $1.7200 | tube of 30 | [logo]¢U¢Z¢2¢T LM2575M -15 P+ |
| LM2575M-3.3 | SOIC WIDE | 24 | Full production | N/A | N/A | Samples (Order Parts) | 1K+ | $1.7200 | tube of 30 | [logo]¢U¢Z¢2¢T LM2575M -3.3 P+ |
| LM2575M-5.0 | SOIC WIDE | 24 | Full production | N/A | N/A | Samples (Order Parts) | 1K+ | $1.7200 | tube of 30 | [logo]¢U¢Z¢2¢T LM2575M -5.0 P+ |
| LM2575M-ADJ | SOIC WIDE | 24 | Full production | N/A | N/A | Samples (Order Parts) | 1K+ | $1.7200 | tube of 30 | [logo]¢U¢Z¢2¢T LM2575M -ADJ P+ |
| LM2575MX-12 | SOIC WIDE | 24 | Full production | N/A | N/A | • (Order Parts) | 1K+ | $1.7500 | reel of 1000 | [logo]¢U¢Z¢2¢T LM2575M -12 P+ |
| LM2575MX-15 | SOIC WIDE | 24 | Full production | N/A | N/A | • | 1K+ | $1.7500 | reel of 1000 | [logo]¢U¢Z¢2¢T LM2575M -15 P+ |
| LM2575MX-3.3 | SOIC WIDE | 24 | Full production | N/A | N/A | • | 1K+ | $1.7500 | reel of 1000 | [logo]¢U¢Z¢2¢T LM2575M -3.3 P+ |
| LM2575MX-5.0 | SOIC WIDE | 24 | Full production | N/A | N/A | • (Order Parts) | 1K+ | $1.7500 | reel of 1000 | [logo]¢U¢Z¢2¢T LM2575M -5.0 P+ |
| LM2575MX-ADJ | SOIC WIDE | 24 | Full production | N/A | N/A | • (Order Parts) | 1K+ | $1.7500 | reel of 1000 | [logo]¢U¢Z¢2¢T LM2575M -ADJ P+ |
| LM 2575N-12 | MDIP | 16 | Full production | N/A | N/A | Samples | 1K+ | $1.7200 | tube of | [logo]¢U¢Z¢3¢T¢P LM2575N |

*Fig. 5D*

| LM2575N-12 | MDIP | 16 | Full production | N/A | N/A | Samples [Order Parts] | 1K+ | $1.7200 | tube of 20 | [logo]¢U¢Z¢3¢T¢P LM2575N -12 P+ |
|---|---|---|---|---|---|---|---|---|---|---|
| LM2575N-15 | MDIP | 16 | Full production | N/A | N/A | Samples [Order Parts] | 1K+ | $1.7200 | tube of 20 | [logo]¢U¢Z¢3¢T¢P LM2575N -15 P+ |
| LM2575N-5.0 | MDIP | 16 | Full production | N/A | N/A | Samples [Order Parts] | 1K+ | $1.7200 | tube of 20 | [logo]¢U¢Z¢3¢T¢P LM2575N -5.0 P+ |
| LM2575N-ADJ | MDIP | 16 | Full production | N/A | N/A | Samples [Order Parts] | 1K+ | $1.7200 | tube of 20 | [logo]¢U¢Z¢3¢T¢P LM2575N -ADJ P+ |
| LM2575T-12 | TO-220 | 5 | Full production | N/A | N/A | Samples [Order Parts] | 1K+ | $1.4300 | tube of 45 | [logo]¢U¢Z¢2¢T LM2575T -12 P+ |
| LM2575T-15 | TO-220 | 5 | Full production | N/A | N/A | Samples [Order Parts] | 1K+ | $1.4300 | tube of 45 | [logo]¢U¢Z¢2¢T LM2575T -15 P+ |
| LM2575T-3.3 | TO-220 | 5 | Full production | N/A | N/A | Samples [Order Parts] | 1K+ | $1.4300 | tube of 45 | [logo]¢U¢Z¢2¢T LM2575T -3.3 P+ |
| LM2575T-5.0 | TO-220 | 5 | Full production | N/A | N/A | Samples [Order Parts] | 1K+ | $1.4300 | tube of 45 | [logo]¢U¢Z¢2¢T LM2575T -5.0 P+ |
| LM2575T-ADJ | TO-220 | 5 | Full production | N/A | N/A | Samples [Order Parts] | 1K+ | $1.4300 | tube of 45 | [lo go]¢U¢Z¢2¢T LM2575T -ADJ P+ |
| LM2575S-12 | TO 263 | 5 | Full production | N/A | N/A | Samples [Order Parts] | 1K+ | $1.4300 | tube of 45 | [logo]¢U¢Z¢2¢T LM2575S -12 P+ |
| LM2575S-15 | TO 263 | 5 | Full production | N/A | N/A | [Order Parts] | 1K+ | $1.4300 | tube of 45 | [logo]¢U¢Z¢2¢T LM2575S -15 P+ |
| LM2575S-3.3 | TO 263 | 5 | Full production | N/A | N/A | Samples [Order Parts] | 1K+ | $1.4300 | tube of 45 | [logo]¢U¢Z¢2¢T LM2575S -3.3 P+ |
| LM2575S- | TO | 5 | Full | N/A | N/A | Samples | 1K+ | $1.4300 | tube | [logo]¢U¢Z¢2¢T |

*Fig. 5E*

| LM2575S-ADJ | TO 263 | 5 | Full production | N/A | N/A | Samples<br>(Order Parts) | 1K+ | $1.4300 | tube of 45 | [logo]¢U¢Z¢2¢T LM2575S-ADJ P+ |
|---|---|---|---|---|---|---|---|---|---|---|
| LM2575SX-12 | TO 263 | 5 | Full production | N/A | N/A | . | 1K+ | $1.4800 | reel of 500 | [logo]¢U¢Z¢2¢T LM2575S-12 P+ |
| LM2575SX-15 | TO 263 | 5 | Full production | N/A | N/A | . | 1K+ | $1.4800 | reel of 500 | [logo]¢U¢Z¢2¢T LM2575S-15 P+ |
| LM2575SX-3.3 | TO 263 | 5 | Full production | N/A | N/A | (Order Parts) | 1K+ | $1.4800 | reel of 500 | [logo]¢U¢Z¢2¢T LM2575S-3.3 P+ |
| LM2575SX-5.0 | TO 263 | 5 | Full production | N/A | N/A | (Order Parts) | 1K+ | $1.4800 | reel of 500 | [logo]¢U¢Z¢2¢T LM2575S-5.0 P+ |
| LM2575SX-ADJ | TO 263 | 5 | Full production | N/A | N/A | (Order Parts) | 1K+ | $1.4800 | reel of 500 | [logo]¢U¢Z¢2¢T LM2575S-ADJ P+ |
| LM2575-ADJ MDC | die | | Full production | N/A | N/A | . | | | N/A | |

Design Tools

| Title | Size (in Kbytes) | Date | View Online | Download | Receive via Email |
|---|---|---|---|---|---|
| SimpleSwitcher® DC-DC Converters Design Software | 14 Kbytes | 1-Nov -2000 | | View | |

*Fig. 5F*

Application Notes

| Title | Size (in Kbytes) | Date | View Online | Download | Receive via Email |
|---|---|---|---|---|---|
| AN-1061: AN-1061 Power Conversion in Line-Powered Equipment | 142 Kbytes | 5-Jan-97 | View Online | Download | Receive via Email |
| AN-776: Application Note 776 20 Watt Simple Switcher Forward Converter | 387 Kbytes | 1-May-98 | View Online | Download | Receive via Email |

Please use Adobe Acrobat to view PDF file(s). If you have trouble printing, see Printing Problems.

*[Information as of 6-Nov-2000]*

| Quick Search | Parametric Search | System Diagrams | Product Tree | Home |

Fig. 5G

National Semiconductor

MY WEBENCH™

> 1 Choose a Part > ② Create a Design > 3 Analyze a Design > 4 Build It! >  — 606
  Components ⋅ Operating Values ⋅ Schematic — 604      MY Designs
  602

| Design: Design#6 | | | | Choose Operation |
|---|---|---|---|---|
| Device: LM2672 | Aug 30 2000 4:23PM | ID: 229899_6 | | Delete, Copy |
| Design Requirements | Output #1 | | | Rename, Add Notes |
| VinMin = 14.00 V | Vout= 3.30 V | | | Print, XML |
| VinMax = 22.00 V | Iout= 1.00 A | | | |

| Components | | | | |
|---|---|---|---|---|
| Part | Manufacturer | Part# | Attributes | |
| Cb | AVX | 08055C103KAT | 0.010000 uF | Select Alternate Part |
| Cin | Nichicon | UPL1V121MPH | 120.00 uF, 0.1400 Ohms | Select Alternate Part |
| Cout | Vishay - Sprague | 594D127X06R3C2T | 120.00 uF, 0.0850 Ohms | Select Alternate Part |
| Css | AVX | 08055C103KAT | 0.010000 uF | Select Alternate Part |
| D1 | General Semiconductor | SS24 | 0.50 V | Select Alternate Part |
| IC | National Semiconductor | LM2672N-3.3 | 3.3, Buck | Select Alternate Part |
| L1 | Coiltronics | UP2T -330 | 33.000 UH, 0.0790 Ohms | Select Alternate Part |

Quick Search

☐ Parametric Search   System Diagrams   Product Tree   Back To Webench

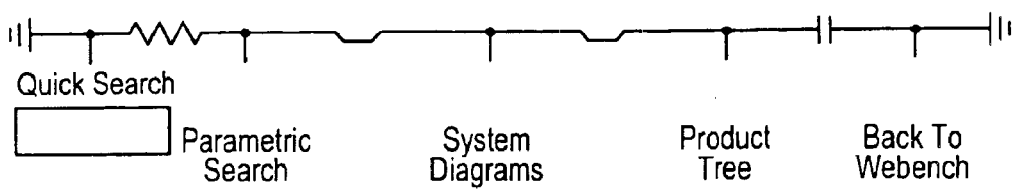

*Fig. 6*

MYWEBENCH™

> 1 Choose a Part > 2 Create a Design > 3 Analyze a Design > 4 Build It!  —606
> Components • Operating Values • Schematic —604                MY Designs

| Design: Design#6 | | | Choose Operation |
|---|---|---|---|
| Device: LM2672 | Aug 30 2000 4:23PM | ID: 229899_6 | Delete, Copy |
| Design Requirements | Output #1 | | Rename, Add Notes |
| VinMin = 14.00 V | Vout= 3.30 V | | Print, XML |
| VinMax = 22.00 V | Iout= 1.00 A | | |

Operating Values

| # | Description | Parameter | Value |
|---|---|---|---|
| 1 | Continuous or Discontinuous Conduction mode, inductor current goes to zero in Discontinuous Conduction | Mode | Cont |
| 2 | Total Output Power | Pout | 3.30 W |
| 3 | Pulse Width Modulation (PWM) frequency | Frequency | 260.00 kHz |

Operating Point at Vin= 22.00 V

| # | Description | Parameter | Value |
|---|---|---|---|
| 1 | Bode Plot Phase Margin | Phase Marg | 97.68 Deg |
| 2 | Bode Plot Crossover Frequency, indication of bandwidth of supply | Cross Freq | 48.98 kHz |
| 3 | Peak-to-peak ripple voltage | Vout p-p | 31.93 mV |
| 4 | IC Junction Temperature | IC Tj | 95.40 øC |
| 5 | IC Junction to Ambient Thermal Resistance | ICThetaJA | 100.21 øC/W |
| 6 | Steady State Efficiency | Efficiency | 81.17 % |
| 7 | Steady State PWM Duty Cycle, range limits from 0 to 100 | Duty Cycle | 17.47 % |

Current Analysis

| # | Description | Parameter | Value |
|---|---|---|---|
| 1 | Average input current | Iin Avg | 0.45 A |
| 2 | Peak Current in IC for Steady State Operating Point | IC Ipk | 1.19 A |
| 3 | Input Capacitor RMS ripple current | Cin IRMS | 0.20 A |
| 4 | Inductor ripple current, peak-to-peak value | L Ipp | 0.38 A |
| 5 | Output Capacitor RMS ripple current | Cout IRMS | 92.07 mA |
| 6 | ICs Maximum rated peak current | IC Ipk Max | 1.30 A |

*Fig. 7A*

| Power Dissipation Analysis | | |
|---|---|---|
| # Description | Parameter | Value |
| 1 Diode Power Dissipation | Diode Pd | 0.41 W |
| 2 Inductor Power Dissipation | L Pd | 79.00 mW |
| 3 IC Power Dissipation | IC Pd | 0.25 W |
| 4 Input Capacitor Power Dissipation | Cin Pd | 20.47 mW |

Quick Search

Parametric Search     System Diagrams     Product Tree     Back To Webench

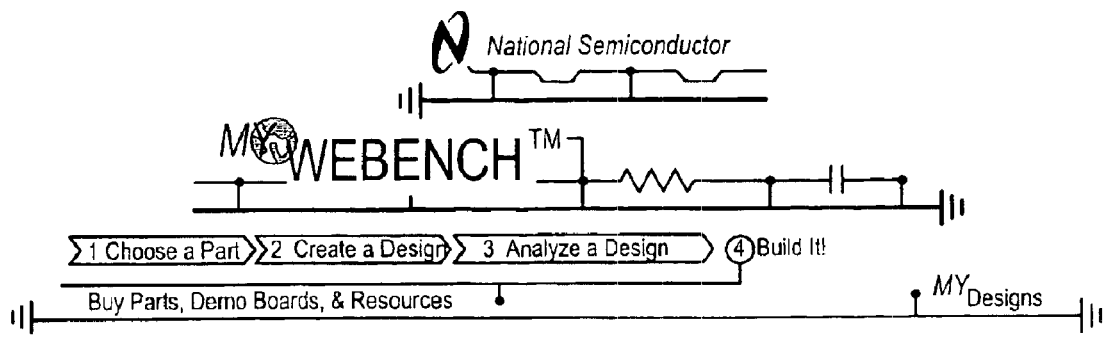

Design ID: 6

| Bill of Materials | | | | | | |
|---|---|---|---|---|---|---|
| Part | Manufacturer | Part# | Attributes | Price | Distributor | Order Parts |
| Cb | AVX | 08055C103KAT | 0.010000 uF | $ 0.02 | Future - Active | - |
| D1 | General Semiconductor | SS24 | 0.50 V | $ 0.20 | Future - Active | - |
| IC | National Semiconductor | LM2672N-3.3 | 3.3,Buck,8-Lead DIP | $ 2.9000 (For Qty=100) | | Order Parts |
| L1 | Coiltronics | UP2T-330 | 33.000 uH,0.0790 Ohms | Price Not Available | 1004 | - |
| Cin | Nichicon | UPL1V121MPH | 120.00 uF,0.1400 Ohms | $ .242 | Avnet | |
| Css | AVX | 08055C103KAT | 0.010000 uF | $ 0.02 | Future - Active | - |
| Cout | Vishay - Sprague | 594D127X06R3C2T | 120.00 uF,0.0850 Ohms | $ 0.83 | Future - Active | - |
| | | | | Total Price: 4.212 | | ORDER KIT |

1002

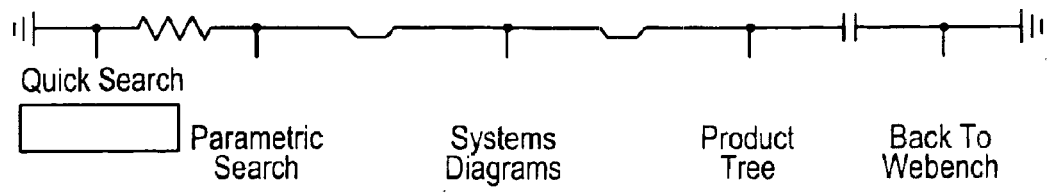

*Fig. 10*

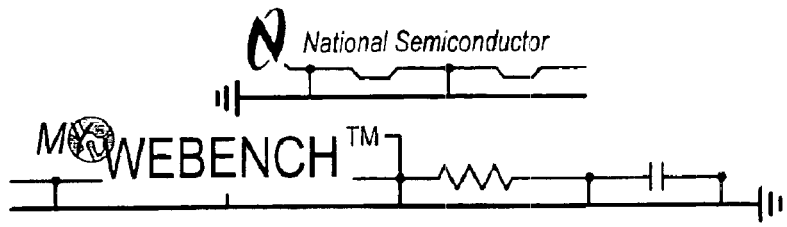

Brian Hickman- You have 6 designs stored in your personal workspace.

| ID | DesignName | Device | CreationDate | ModificationDate | Design Assistant | Comments | Design Operations |
|----|------------|--------|--------------|------------------|------------------|----------|-------------------|
| 6 | Design#6 | LM2672 | Aug 30 2000 4:23PM | | power | | Modify, Analyze, Build, Delete, Add Notes |
| 5 | Design#5 | LM2670 | Aug 30 2000 4:15PM | | power | | Modify, Analyze, Build, Delete, Add Notes |
| 4 | Design#4 | LM2672 | Aug 30 2000 4:02PM | | power | | Modify, Analyze, Build, Delete, Add Notes |
| 3 | Design#3 | LM2575HV | Aug 30 2000 4:01PM | | power | | Modify, Analyze, Build, Delete, Add Notes |
| 2 | Design#2 | LM2575 | Aug 30 2000 3:30PM | | power | | Modify, Analyze, Build, Delete, Add Notes |
| 1 | Design#1 | | Aug 30 2000 3:29PM | | power | | Modify, Analyze, Build, Delete, Add Notes |

Quick Search

 Parametric Search    System Diagrams    Product Tree    Back To Webench

*Fig. 11*

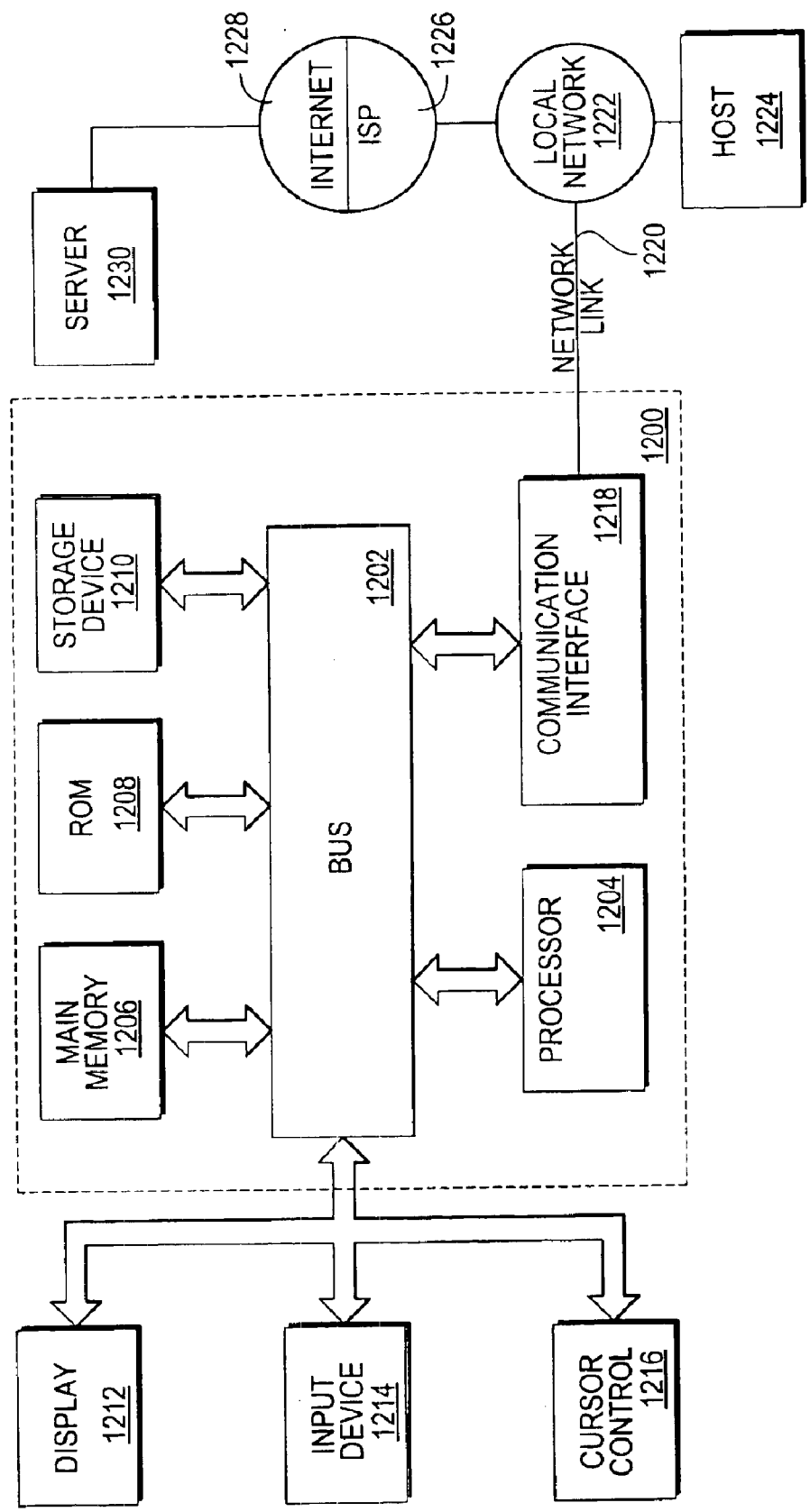

NETWORK-BASED INTEGRATED DEVICE IDENTIFICATION AND ORDERING SYSTEM

FIELD OF THE INVENTION

The present invention relates to techniques for online identification and ordering components that satisfy user-specified circuit requirements.

BACKGROUND OF THE INVENTION

When a user requires a circuit, the user frequently knows little more than the requirements that the circuit must satisfy. To obtain the desired circuit, the user may provide a list of the requirements to a third party that is knowledgeable about those types of circuits, how to design them, and where to obtain the components to make them. That third party may then construct and supply the user with the circuit, with a significant price mark up for the service of designing, obtaining components and constructing the circuit based on the specified requirements.

To avoid having to pay the marked up prices that would be required by a third party, the user may attempt to become educated on circuit design, and obtain parts catalogs from circuit component suppliers. However, the effort required to gain the requisite education and knowledge may not be worth the savings that are achieved thereby. To reduce the effort required to perform some of these tasks, the user may obtain and install specialized client-side tools, such as the Switches Made Simple software product available from National Semiconductor Corporation. While such tools may assist in the circuit design and component selection tasks, the user must still go through the manual process of placing orders for the components. Further, given the rapidity with which circuit component manufacturers change their product lines, the component information used by the specialized client-side software will quickly become outdated unless frequently updated. The inconvenience of having to obtain, install, and keep such specialized software updated does not make this the solution ideal.

Based on the foregoing, it is desirable to provide techniques that allow a user that has specific circuit requirements to obtain a circuit that satisfies those requirements, or the components to make such a circuit, without the user having to obtain additional education or possess specialized software.

SUMMARY OF THE INVENTION

Techniques are provided for designing a circuit that satisfies user-specified functional requirements without the user having to obtain addition education or possess specialized software. According to one embodiment, user-specified functional requirements are received over a network from a client executing a browser. The network may be, for example, the Internet. Based on the user-specified requirements, components and a topology for constructing the circuit are automatically determined. The components determined during this operation have operational values such that, when the components are arranged according to the topology to form the circuit, the circuit satisfies the user-specified functional requirements. One or more web pages that identify the components are then delivered to the browser over the network. According to one aspect of the invention, the component and topology information is used to generate a schematic diagram that is delivered in a web page to the user over the network. According to another aspect of the invention, the user is provided with a web page that has a control which, when selected, initiates an operation for placing an order over said network for one of the components, a kit of all of the components, a custom made circuit made from the components, and/or a prefabricated circuit that is functionally similar to the one that was designed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 illustrates an initial web page that may be presented by a system that implements an embodiment of the invention;

FIG. 4 illustrates a web page of suggested components according to an embodiment of the invention;

FIGS. 5A–5G illustrate a web page that displays product folder information for a particular component, according to an embodiment of the invention;

FIG. 6 illustrates a web page of designed circuit components according to an embodiment of the invention;

FIGS. 7A–7B illustrate a web page showing the operation values of a circuit designed using the designed circuit components, according to an embodiment of the invention;

FIG. 10 illustrates a web page for ordering the designed circuit components, according to an embodiment of the invention;

FIG. 11 illustrates a web page that displays the circuit designs that have been previously saved by a user on user-side storage, according to an embodiment of the invention; and FIG. 12 is a block diagram of a computer system that may be used to implement embodiments of the invention.

DETAILED DESCRIPTION OF THE PREFERRED EMBODIMENT

Techniques are described that allow online identification and ordering components that satisfy user-specified circuit requirements. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

Figure 1:
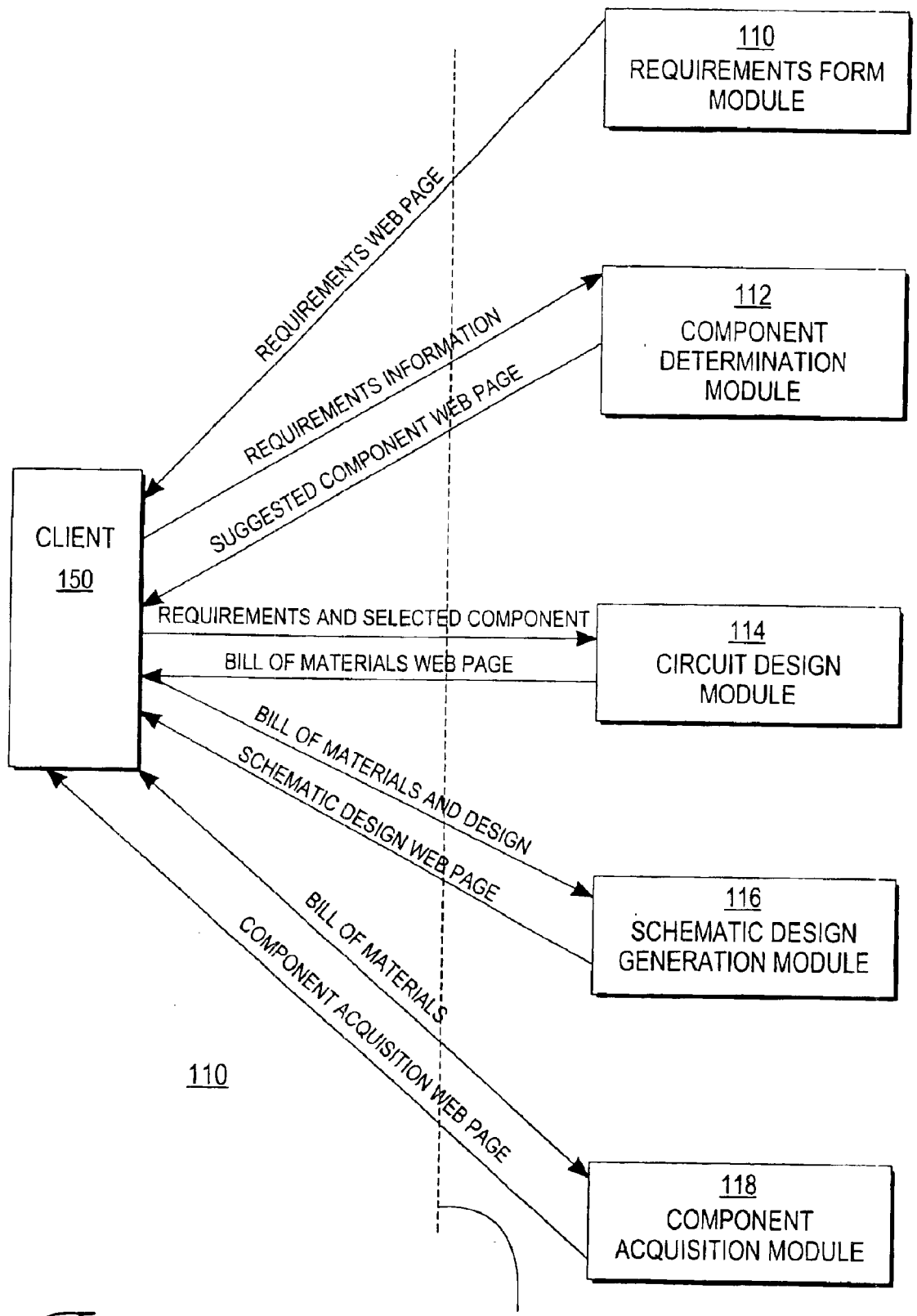
FIG. 1 is a block diagram of a system configured to allow online identification and ordering of components according to an embodiment of the invention.

FIG. 1 is a block diagram that gives an overview of a system 100 used to implement the techniques described hereafter. System 100 includes numerous functional modules that communicate with a client 150 over the Internet 130. While the Internet 130 is used for the purposes of explanation, the network over which the modules communicate with the client 150 may vary from implementation to implementation. In an Internet-based embodiment, the communication between the modules and the client 150 may be performed using the HTTP protocol and one or more web servers (not shown). In the illustrated embodiment, the modules include a requirements form module 110, a component determination module 112, a circuit design module 114, a schematic design generation module 116 and a component acquisition module 118. The functions of each of these modules shall be described in greater detail hereafter.

Functional Overview

According to one embodiment of the invention, a system is provided by which users, with no special client-side software, and little or no knowledge of available circuit components, can easily and efficiently create, test, and order circuits and components that satisfy their functional requirements. According to one implemented embodiment, the user is presented with a series of web pages to achieve this result, beginning with the web page illustrated in FIG. 2.

Referring to FIG. 2, the web page contains text 202 that explains the four general steps of the process to the user, and contains links (e.g. links 204 and 206) to web pages that serve as the interface through which the system walks the user through those steps. It should be noted that many of the links "to web pages" are actually links that result in the execution of software modules which produce, as output, the web pages that are delivered to the user.

Suggesting Components Based on User-Specified Requirements

For the purpose of explanation, it shall be assumed that a user desires to create a power supply. Accordingly, the user selects link 204 of the web page shown in FIG. 2. While the techniques described herein shall be described in the context of designing and ordering parts for a power supply circuit, the techniques are not limited to any particular type of circuit.

Figure 3:
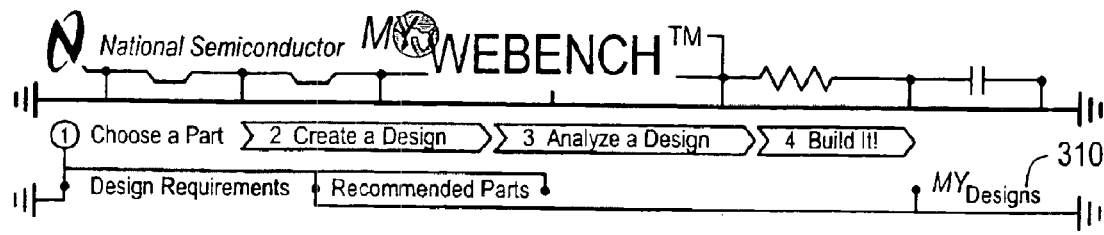
FIG. 3 illustrates a web page for receiving user-specified requirements according to an embodiment of the invention.

According to one embodiment, a web server responds to selection of link 204 by invoking the requirements form module 110. The requirements form module 110 provides one or more "requirements" web pages to the web client 150. The requirements web pages allow the user of the client to specify requirements for a circuit. FIG. 3 is an example of a requirements web page for receiving the requirement information from a user for a power supply circuit. The illustrated requirements page includes user interface controls for specifying minimum and maximum input voltages (controls 302), and an output voltage and amperage (controls 304). The requirements web page further includes controls 306 for additional requirements, such as whether the circuit requires an ON/OFF pin. Other requirements that may apply to a power circuit, for example, may include requirements associated with efficiency, frequency, etc. It should be noted that the specific user interface controls presented by the requirements web pages will vary from implementation to implementation based on a variety of factors, including the type of circuit for which the requirements are being specified.

The requirements information entered by the user into the requirements web pages is transmitted back to the web server. The operation of sending the requirements information to the server may be initiated, for example, by the user selecting a particular control (e.g. button 308) on the requirements web page.

Based on the requirements information, a component determination module 112 determines the components that could be used to build a circuit that would satisfy the specified requirements, and generates one or more "suggested component" web pages. The process of determining the components that could satisfy the specified requirements may be implemented, for example, by applying filters to component data stored in a database. The filters may, for example, compare the values specified in the "output voltage" and "output current" fields of the requirements web page against values in corresponding columns of a "component" table in a database.

The process may also involve using values from the requirements information as input into formulas, where the output of the formulas is used to determine which components could satisfy the specified requirements. For example, assume that the user desires a boost regulator circuit. Integrated circuits used in boost regulators have a switch current rating. The switch current rating of each integrated circuit that can be used in a boost regulator may be stored in the record for that integrated circuit in a database. To determine which integrated circuit may be used, the input voltage, output voltage and output current specified in the requirements information are used to calculate a required switch current rating, and the required switch current rating is compared against the switch current ratings in the database to select those integrated circuits within the database that can satisfy the specified requirements.

FIG. 4 is an example of a suggested component web page generated in response to the requirements specified in FIG. 3. In the present example, the suggested components fall into two categories: switching regulators for use in a Buck Topology, and switching regulators for use in a Flyback Topology. An understanding of the distinction between these categories of switching regulators is not important for the purpose of understanding the techniques described herein. However, it is significant to note that such distinctions may be relevant to the user designing the power circuit. Therefore, the component determination module 112 generates the suggested component web page in a manner that groups the suggested components into those and any other applicable categories.

The component determination module 112 further includes in the suggested component web page other information relevant to the user's selection of a component. In the illustrate embodiment, the other information includes the Maximum current, the efficiency, whether the component has an ON/OFF pin or an Error pin, a field for "other features", the frequency of the component and an estimated price of the component.

In the illustrated implementation, the names of the suggested components are presented in the form of links. Selection of the link associated with a component results in the delivery of a "product folder". The product folder is a web page that presents detailed information about a component. For example, selecting the link 402 associated with the LM2575-3.3 component produces the product folder web page shown on FIGS. 5A–5G. The information and controls contained on the product folder web page of a component shall be described in greater detail hereafter.

The information contained in the suggested component web pages, and the product folders of the components listed in the suggested component web pages, satisfies only part of the users needs. In particular, the user is interested in creating an entire circuit that satisfies the specified requirements, and not merely in identifying a component that could be used in such a circuit. Therefore, according to one embodiment of the invention, the user is presented with a control for automatically generating the design of such a circuit using a component selected from the suggested component web pages.

Automatic Circuit Design

Referring again to FIG. 4, the listing for each component includes a field that contains a button which, when selected, causes the automatic generation of a circuit design that (1) uses the selected component, and (2) satisfies the specified requirements that were initially entered by the user. For example, assume that the user determines, based on the information contained on the suggested components web page and, optionally, the more detailed information on product folder web pages, that the LM2575-3.3 component is the best of the suggested components for the user's purpose. The user may then click on the "create design" button 404 associated with that component to cause generation of a power circuit that (1) uses the LM2575-3.3 component, and (2) satisfies the requirements specified on the requirements web page shown on FIG. 3.

According to one embodiment, selection of a create design button causes a message that (1) indicates the requirement information and (2) identifies the selected component to be sent to a circuit design module 114. In response, the circuit design module 114 designs a circuit that uses the selected component and satisfies the specified requirements. Specifically, the circuit design module 114 determines components that will be required for the circuit in addition to the selected component, and how those components should be arranged to create the circuit (the circuit "topology").

Various techniques may be used by the circuit design module 114 to determine the topology of the circuit. For example, numerous topology "templates" may be stored on the server-side at a location accessible to the circuit design module 114. Data may also be stored that associates general type of circuits with one or more of the topology templates. In an embodiment that uses topology templates, the circuit design module 114 selects the topology template based on the type of circuit that is being designed, and then uses the selected topology template, the selected suggested component, and the requirements information to determine the other components required for the circuit.

According to one embodiment, the circuit design module 114 transmits back to the user one or more "bill of materials" web pages. The bill of materials web pages identify the components that are included in the circuit designed by the circuit design module 114 (referred to herein collectively as the "designed circuit components"). The designed circuit components thus include the selected component and the additional components determined by the circuit design module 114.

For the purpose of illustration, it shall be assumed that the user selects the create to design button associated with the LM2672-3.3 component. FIG. 6 illustrates a bill of materials web page that indicates the components used in the circuit design generated by the circuit design module 114. In addition to the selected LM2672-3.3 component, the bill of materials web page lists numerous other designed circuit components from a variety of manufacturers. If the user desires to substitute any of the designed circuit components listed in the bill of materials page for a functionally equivalent component, the user may select the "select alternate part" button associated with that component. In response to selection of the "select alternate part" button associated with a component, the user is presented with a list of functionally equivalent components. Such substitutions may be desirable, for example, if the user desires components from a particular manufacturer.

Figure 7B:
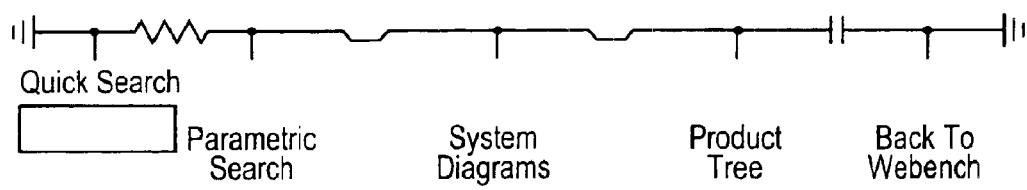

Once the user has made any desired component substitutions, the user may select the operating values control to obtain operating value information for the circuit created by the circuit design module 114 using the parts listed in the bill of materials page. FIGS. 7a and 7b illustrate a web page showing the operating parameters for the circuit associated with the bill of materials of FIG. 6. From either the bill of materials web page or the operating values web page, the user may select a "schematic" control 604 to cause a schematic diagram of the circuit to be generated.

In response to selection of the schematic control 604, one or more messages identifying the designed circuit components, as well as the topology data for the generated circuit, are sent to a schematic diagram generation module 116. The schematic diagram generation module 116 generates one or more web pages that include a schematic diagram of the circuit, and delivers the schematic web pages to the user.

Schematic Diagram Generation

Figure 8:
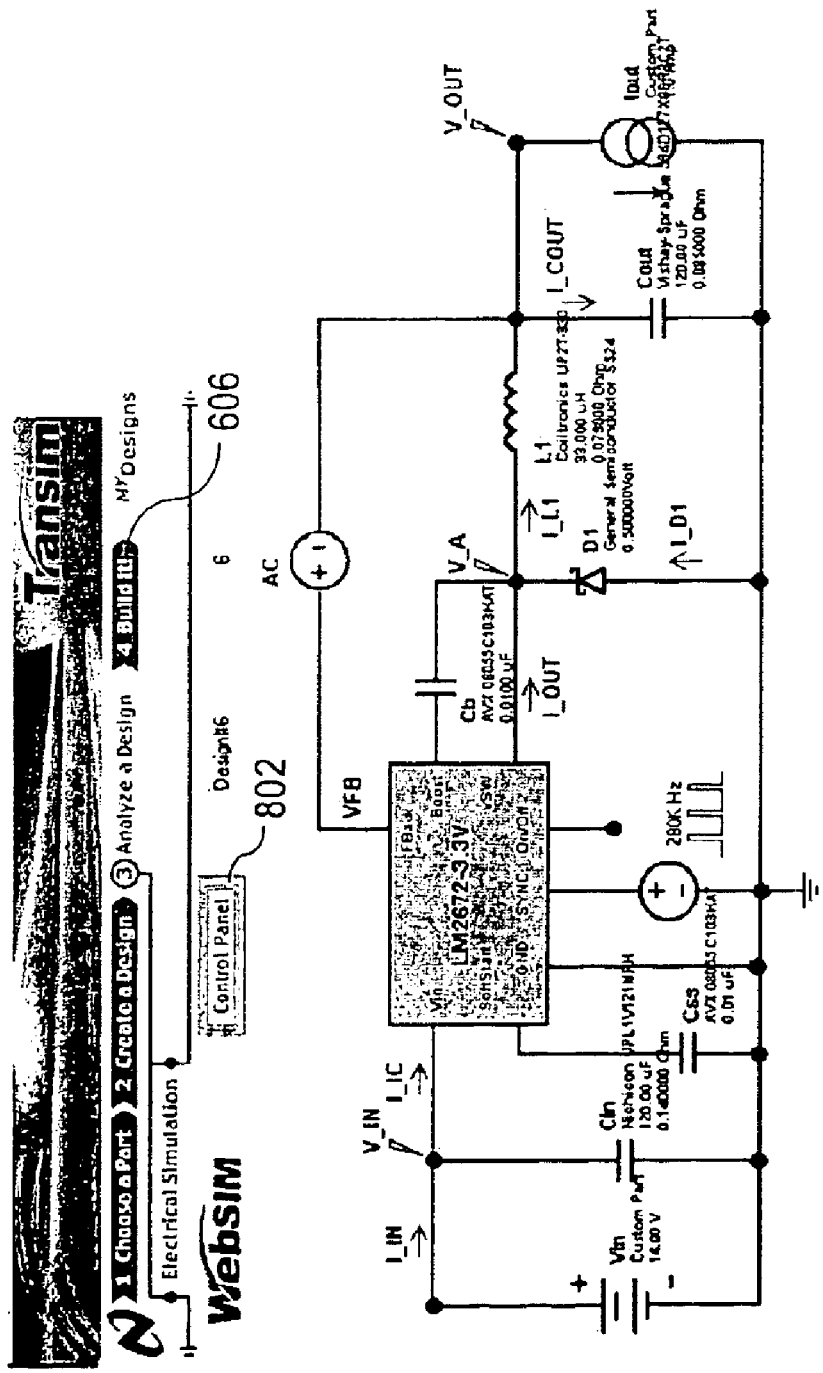
FIG. 8 illustrates a web page that illustrates a schematic diagram of a circuit that uses the designed circuit components according to an embodiment of the invention.
Figure 9:
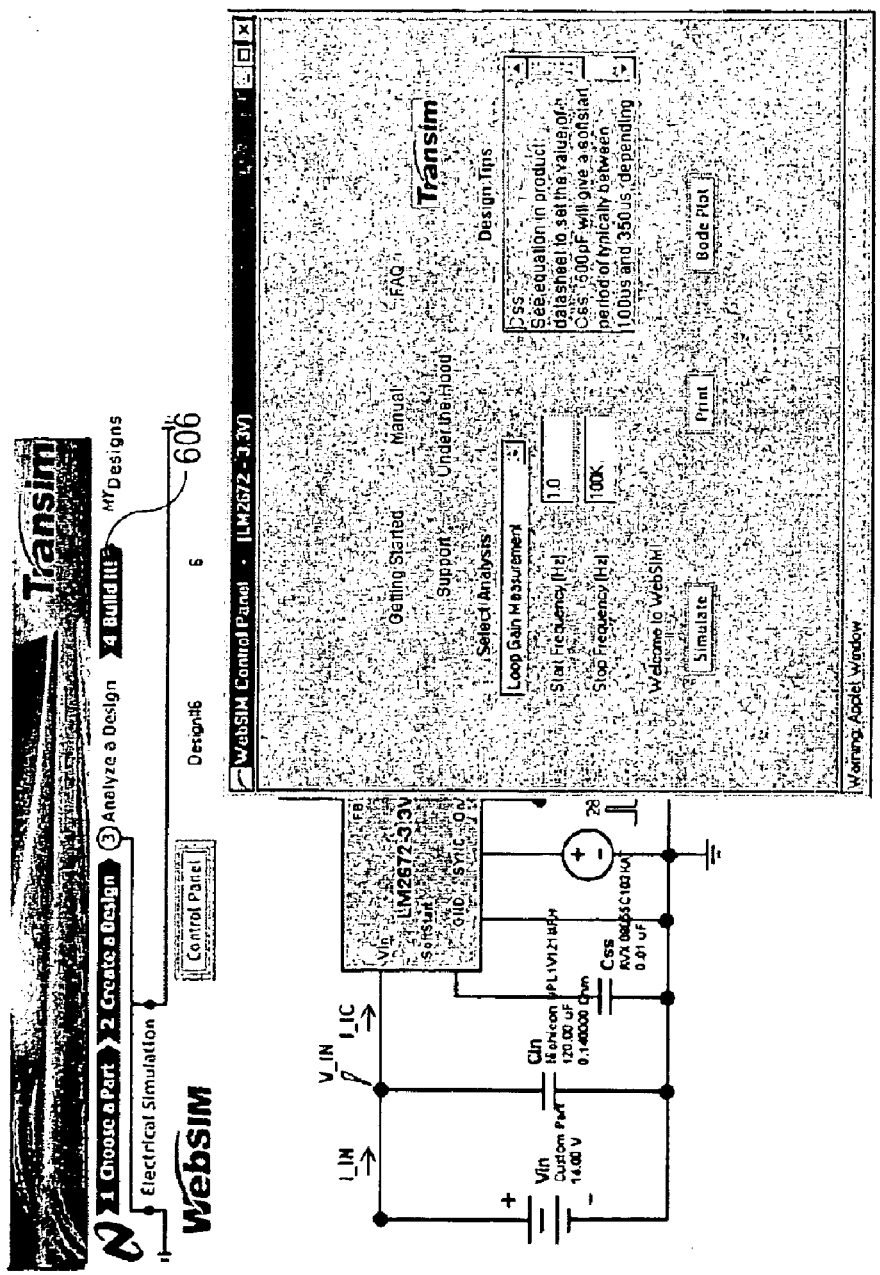
FIG. 9 illustrates a control panel that contains controls to analyze the circuit shown in FIG. 8.

Referring to FIG. 8, it illustrates a schematic diagram web page that may be generated and delivered to a user in response to user selection of schematic button 604. As illustrated in FIG. 8, the schematic diagram includes the components identified in the bill of materials page arranged in a circuit that satisfies the requirements that were originally specified by the user. According to one embodiment, the schematic diagram generation module 116 used to generate the schematic web pages is the WebSIM module available from Transim, Inc. The WebSIM module provides a control panel button 802 which, when selected, causes the generation of a control panel window (shown in FIG. 8) that includes controls that allow the user to analyze the displayed circuit. The specific features of the WebSIM module are beyond the scope of the present invention, and therefore shall not be described in detail.

While the illustrated embodiment uses the WebSIM module for generating schematic diagram web pages, the present invention is not limited to any particular schematic diagram generation module 116. Any module capable of generating a schematic diagram based on a list of components and schematic information may be used.

Building the Circuit

According to one embodiment, one or more of the web pages provided to the user include a control which, when selected, invokes a component acquisition module. The component acquisition module, in turn, provides one or more component acquisition web pages to the user. The component acquisition web pages include information and/or controls for ordering the components from which the generated circuit is constructed.

In the embodiment illustrated in the figures, a "build it" button 606 (see, e.g., FIGS. 6, 7a, 8 and 9) is provided which, when selected, provides component acquisition web pages to the user. The component acquisition web page presented to the user in response to selection of build it button 606 may, for example, contain the information shown in FIG. 10. Referring to FIG. 10, the component acquisition web page includes a table that lists, for each in component, a manufacturer, a part number, attributes, price, and distributor. The table also includes an "Order Parts" column that includes controls which, when selected, initiate an online ordering operation for the corresponding component. According to one embodiment, the component acquisition web page may also include an "order kit" button 1002 which, when selected, initiates an online ordering operation for a kit that includes all of the components required to make the circuit.

Typically, the party that would handle the order of a single component would be the manufacturer or distributor of the component. However, the party that handles the "kit" order may be a third party. In response to the order of a kit, the party from whom the kit is ordered places corresponding component orders with the component manufacturers. The process of placing the corresponding component order can be executed automatically upon receipt and approval of a kit order.

If the user selects the "order kit" button, the user will receive the components to make the circuit. However, the user may prefer to receive the circuit itself, already assembled. Therefore, the user may alternatively or additionally be presented with an "order circuit" button (not shown) which, when selected, causes the components to be ordered and sent to a circuit board maker. The circuit board maker constructs the circuit board from the ordered components and delivers the custom-made circuit board to the user that placed the order.

Under some circumstances, circuit board manufacturers may already have prefabricated circuit boards that are similar to the automatically designed circuit. According to one embodiment, the server-side database includes information about such prefabricated circuit boards, and presents them to the user when the similarity between the prefabricated boards and the users requirements exceeds a predetermined similarity threshold. The prefabricated boards may be presented, for example, on the suggested component web page, the bill of materials web page, and/or the component acquisition web page.

Persistent Storage of Designs

A user may not be prepared to order the components of a circuit during the same session in which the circuit is generated for the user using the techniques described above. Therefore, according to one embodiment of the invention, a mechanism is provided for storing the designs persistently on a server-side storage device. The designs may be stored, for example, in a server-side database that associates the designs with the user-id of the user that created the design. The event that triggers the storage of a design in the database may be, for example, the creation of the design. Alternatively, a control may be provided which, when selected, causes the designs to be saved.

Referring to FIG. 3, the requirements web page includes a "my designs" control 310. When a user selects the my designs control 310, a saved designs web page that lists all of the saved designs for the user is presented to the user. FIG. 11 illustrates is an example of a saved designs web page. The saved designed web page illustrated in FIG. 11 includes listings of a user's previously saved designs. The listing includes, for each saved design, a design ID, a design name, the model number of the integrated circuit around which the design is built, the creation date of the design, modification dates to the design, the name of the "design assistant" tool used to create the design, comments, and a design operation field.

Controls are provided to allow the user to change the design name of a design, to add comments about the design, and to modify, analyze, build, or delete the design. Selection of the modify, analyze or build controls results in the delivery of an appropriate web page, as described above. Selection of the delete, change name or add comments controls causes corresponding information to be deleted, changed, or added to the server-side database.

According to one embodiment, controls (not shown) are provided for "sharing" a design with another user. Specifically, a first user may select one or more of the first user's designs, and then specify one or more second users with whom the design is to be shared. In response, the server-side database is updated to establish an association between the design and the one or more second users. When one of the second users is presented with a list of available saved designs, any designs that have been shared with the user are included in the list.

Product Folder Web Pages

Referring to FIGS. 5A–5G, they illustrate a product folder web page for the LM2575 component, according to one embodiment of the invention. In the illustrated embodiment, the product folder web page includes links 502 to related components, a parametric table 504 showing the operating parameter of the component, and numerous sections, including a General Description section, a Features section, an Applications section, a Datasheet section, a Package Availability, Models, Samples & Pricing section, a Design Tools section, and an Application Notes section.

The General Description section includes a general description of the component. The Features section lists the features of the component. The Applications section lists applications in which the component is typically used. The Datasheet section contains links to view online or download the data sheets for the component.

The Package Availability, Models, Samples & Pricing section lists packages that use the component, indicates the status, availability and price of the packages, and contains controls which, when selected initiate an operation for placing an order for the packages. The Design Tools section includes a link to view online or download information about software tools that may be used to assist in designing circuits that use the component. The Application Notes section includes links to view online or download information about applications that use the component.

Hardware Overview

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for implementing the techniques described herein. According to one embodiment of the invention, those techniques are performed by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution. In this manner, computer system 1200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for designing a circuit that satisfies user-specified functional requirements, the method comprising the steps of:

receiving said user-specified functional requirements over a network from a client;

automatically determining, based on said user-specified requirements, components and a topology for constructing a particular circuit that is constructable on a circuit board;

wherein the step of determining components includes determining components that have operational values such that, when said components are arranged according to said topology to form said particular circuit, the particular circuit satisfies said user-specified functional requirements; and delivering to said client over said network component information that identifies said components.

2. The method of claim 1 wherein:
the client is executing a browser; and
the step of delivering said component information includes delivering to said browser one or more web pages that identify said components.

3. The method of claim 2 wherein the step of delivering includes delivering one or more web pages that identify said components and that include at least one control which, when selected, initiates an operation for placing an order over said network for at least one of said components.

4. The method of claim 3 wherein the step of automatically determining components includes the steps of:
automatically determining, based on said user-specified requirements, a plurality of suggested components, each of which may be used to design a circuit that satisfies said user-specified functional requirements;
delivering to said browser over said network one or more suggested component web pages that identify said plurality of suggested components;
in response to selection of a suggested component of said plurality of suggested components identified in said one or more suggested component web pages, receiving from said browser over said network a message that identifies the selected suggested component; and
automatically determining, based on said user-specified requirements and said selected suggested component, components for constructing a circuit that includes said selected suggested component and that satisfies said user-specified functional requirements.

5. The method of claim 4 wherein the step of delivering to said browser over said network one or more suggested component web pages includes delivering one or more suggested component web pages that specify, for each suggested component of said plurality of suggested components, a price value.

6. The method of claim 4 wherein the step of delivering to said browser over said network one or more suggested component web pages includes delivering one or more suggested component web pages that specify, for each suggested component of said plurality of suggested components, a component identifier and one or more operating values.

7. The method of claim 3 further comprising the steps of:
determining a set of alternative components for a particular component of said components, wherein each alternative component in said set of alternative components may be used in said particular circuit in place of a particular component;
delivering to said browser over said network one or more web pages that identify said components and that include a control that is associated said particular component;
in response to selection of said control, displaying on said browser said set of alternative components; and
in response to selection of one of said alternative components, updating said design to include said selected alternative component in place of said particular component.

8. The method of claim 3 wherein said operation for placing an order is an operation for placing an order for a kit that includes a plurality of said components.

9. The method of claim 8 wherein said operation for placing an order is an operation for placing an order for a kit that includes all of said components.

10. The method of claim 3 wherein said operation for placing an order is an operation for placing an order with another party for the other party to construct said particular circuit.

11. The method of claim 3 further comprising the step of automatically determining, based on said user-specified requirements, one or more prefabricated circuits for that satisfy said user-specified functional requirements.

12. The method of claim 11 further comprising the step delivering to said browser over said network one or more web pages that identify said one or more prefabricated circuits and that include at least one control which, when selected, initiates an operation for placing an order over said network for at least one of said one or more prefabricated circuits.

13. The method of claim 3 wherein:
the user-specified functional requirements include one or more input values; and
the step of automatically determining components includes
applying one or more input values from said user-specified functional requirements to a formula to determine one or more required parameter values, and
determining said components based on said one or more required parameter values.

14. The method of claim 2 further comprising the steps of:
providing data that identifies said components and said topology to a schematic design generation module; and
delivering to said browser, based on output from said schematic design generation module, one or more web pages that display a schematic design of said particular circuit that includes said components arranged according to said design.

15. The method of claim 14 wherein:
the user-specified functional requirements include one or more input values; and
the step of automatically determining components includes
applying one or more input values from said user-specified functional requirements to a formula to determine one or more required parameter values, and
determining said components based on said one or more required parameter values.

16. The method of claim 14 wherein the browser is operated by a particular user, the method further comprising the steps of:
storing, on server-side storage, design data that specifies the design of said particular circuit and data that associates the design data with said user; and
delivering to said browser a web page that identifies a set of previously saved designs associated with said user, said previously saved designs including the design of said particular circuit; and
in response to user input at said browser, delivering to said browser a web page that includes a schematic diagram generated based on the design data stored on said server-side storage.

17. The method of claim 16 further comprising the steps of:
in response to user input at said browser that indicates that said design is to be shared with a second user, storing data that associates the design data with said second user;
delivering to a second browser operated by said second user a web page that identifies a set of previously saved designs associated with said second user, said previously save designs including the design of said particular circuit; and in response to user input at said second browser, delivering to said second browser a web page that includes a schematic diagram generated based on the design data stored on said server-side.

18. The method of claim 14 wherein:

the step of automatically determining components includes determining components that have specific operational values;

the step of providing data that identifies said components includes providing data that identifies components with said specific operational values; and the step of delivering one or more web pages that display a schematic design of said particular circuit includes delivering to said browser a web page that displays an arrangement of said components with said specific operational values.

19. A computer-readable medium carrying instructions for designing a circuit that satisfies user-specified functional requirements, the instructions including instructions for performing the steps of:

receiving said user-specified functional requirements over a network from a client;

automatically determining, based on said user-specified requirements, components and a topology for constructing a particular circuit that is constructable on a circuit board;

wherein the step of determining components includes determining components that have operational values such that, when said components are arranged according to said topology to form said particular circuit, the particular circuit satisfies said user-specified functional requirements; and delivering to said client over said network component information that identifies said components.

20. The computer-readable medium of claim 19 wherein:

the client is executing a browser; and the step of delivering said component information includes delivering to said browser one or more web pages that identify said components.

21. The computer-readable medium of claim 20 wherein the step of delivering includes delivering one or more web pages that identify said components and that include at least one control which, when selected, initiates an operation for placing an order over said network for at least one of said components.

22. The computer-readable medium of claim 21 wherein the step of automatically determining components includes the steps of:

automatically determining, based on said user-specified requirements, a plurality of suggested components, each of which may be used to design a circuit that satisfies said user-specified functional requirements;

delivering to said browser over said network one or more suggested component web pages that identify said plurality of suggested components;

in response to selection of a suggested component of said plurality of suggested components identified in said one or more suggested component web pages, receiving from said browser over said network a message that identifies the selected suggested component; and automatically determining, based on said user-specified requirements and said selected suggested component, components for constructing a circuit that includes said selected suggested component and that satisfies said user-specified functional requirements.

23. The computer-readable medium of claim 22 wherein the step of delivering to said browser over said network one or more suggested component web pages includes delivering one or more suggested component web pages that specify, for each suggested component of said plurality of suggested components, a price value.

24. The computer-readable medium of claim 22 wherein the step of delivering to said browser over said network one or more suggested component web pages includes delivering one or more suggested component web pages that specify, for each suggested component of said plurality of suggested components, a component identifier and one or more operating values.

25. The computer-readable medium of claim 21 further comprising instructions for performing the steps of:

determining a set of alternative components for a particular component of said components, wherein each alternative component in said set of alternative components may be used in said particular circuit in place of a particular component;

delivering to said browser over said network one or more web pages that identify said components and that include a control that is associated said particular component;

in response to selection of said control, displaying on said browser said set of alternative components; and in response to selection of one of said alternative components, updating said design to include said selected alternative component in place of said particular component.

26. The computer-readable medium of claim 21 wherein said operation for placing an order is an operation for placing an order for a kit that includes a plurality of said components.

27. The computer-readable medium of claim 26 wherein said operation for placing an order is an operation for placing an order for a kit that includes all of said components.

28. The computer-readable medium of claim 21 wherein said operation for placing an order is an operation for placing an order with another party for the other party to construct said particular circuit.

29. The computer-readable medium of claim 21 further comprising instructions for performing the step of automatically determining, based on said user-specified requirements, one or more prefabricated circuits for that satisfy said user-specified functional requirements.

30. The computer-readable medium of claim 29 further comprising instructions for performing the step delivering to said browser over said network one or more web pages that identify said one or more prefabricated circuits and that include at least one control which, when selected, initiates an operation for placing an order over said network for at least one of said one or more prefabricated circuits.

31. The computer-readable medium of claim 21 wherein:

the user-specified functional requirements include one or more input values; and the step of automatically determining components includes applying one or more input values from said user-specified functional requirements to a formula to determine one or more required parameter values, and determining said components based on said one or more required parameter values.

32. The computer-readable medium of claim 20 further comprising the steps of:

providing data that identifies said components and said topology to a schematic design generation module; and delivering to said browser, based on output from said schematic design generation module, one or more web pages that display a schematic design of said particular circuit that includes said components arranged according to said design.

33. The computer-readable medium of claim 32 wherein:

the user-specified functional requirements include one or more input values; and the step of automatically determining components includes applying one or more input values from said user-specified functional requirements to a formula to determine one or more required parameter values, and determining said components based on said one or more required parameter values.

34. The computer-readable medium of claim 32 wherein the browser is operated by a particular user, the computer-readable medium further comprising instructions for performing the steps of:

storing, on se rver-side storage, design data that specifies the design of said particular circuit and data that associates the design data with said user; and delivering to said browser a web page that identifies a set of previously saved designs associated with said user, said previously saved designs including the design of said particular circuit; and in response to user input at said browser, delivering to said browser a web page that includes a schematic diagram generated based on the design data stored on said server-side storage.

35. The computer-readable medium of claim 34 further comprising instructions for performing the steps of:

in response to user input at said browser that indicates that said design is to be shared with a second user, storing data that associates the design data with said second user;

delivering to a second browser operated by said second user a web page that identifies a set of previously saved designs associated with said second user, said previously save designs including the design of said particular circuit; and in response to user input at said second browser, delivering to said second browser a web page that includes a schematic diagram generated based on the design data stored on said server-side.

36. The computer-readable medium of claim 32 wherein:

the step of automatically determining components includes determining components that have specific operational values;

the step of providing data that identifies said components includes providing data that identifies components with said specific operational values; and the step of delivering one or more web pages that display a schematic design of said particular circuit includes delivering to said browser a web page that displays an arrangement of said components with said specific operational values.

* * * * *